US007113880B1

(12) United States Patent
Rhea et al.

(10) Patent No.: US 7,113,880 B1
(45) Date of Patent: Sep. 26, 2006

(54) VIDEO TESTING VIA PIXEL COMPARISON TO KNOWN IMAGE

(75) Inventors: Paul A. Rhea, Lawrenceville, GA (US); Stefano Righi, Lawrenceville, GA (US)

(73) Assignee: American Megatrends, Inc., Norcross, GA (US)

( * ) Notice: Subject to any disclaimer, the term of this patent is extended or adjusted under 35 U.S.C. 154(b) by 220 days.

(21) Appl. No.: 10/771,979

(22) Filed: Feb. 4, 2004

(51) Int. Cl.
*G06K 9/20* (2006.01)

(52) U.S. Cl. ...................... 702/117; 702/189; 382/221; 345/419; 345/614; 345/625

(58) Field of Classification Search ..................... None
See application file for complete search history.

(56) References Cited

U.S. PATENT DOCUMENTS 5,297,043 A * 3/1994 Tuy et al. ...................... 702/27
6,496,176 B1 * 12/2002 Kondoh et al. ............. 345/101
6,580,466 B1 * 6/2003 Siefken ....................... 348/700
6,591,010 B1 * 7/2003 Russin ........................ 382/209
6,792,131 B1 * 9/2004 Wilt ........................... 382/103
2002/0008676 A1 * 1/2002 Miyazaki et al. .............. 345/6
2003/0137506 A1 * 7/2003 Efran et al. ................. 345/419
2003/0200078 A1 * 10/2003 Luo et al. ...................... 704/2
2004/0227751 A1 * 11/2004 Anders ........................ 345/419
2004/0228526 A9 * 11/2004 Lin et al. ..................... 382/165
2004/0233315 A1 * 11/2004 Lin et al. ............... 348/333.01
2005/0219241 A1 * 10/2005 Chun ......................... 345/419

OTHER PUBLICATIONS

US Appl. No. 60,438,744 filed Jan. 8, 2003, Anders.*

* cited by examiner

*Primary Examiner*—Carol S. W. Tsai
(74) *Attorney, Agent, or Firm*—Hope Baldauff Hartman, LLC

(57) ABSTRACT

Methods and systems provide automated testing of computer-generated displays. The proper functionality of a memory storage device on a computer video card and the proper functionality of software for generating computer-generated displays may be tested by storing a display image to a first memory device context while displaying the same image on a computer screen viewable by a user. The image displayed to the computer screen is captured into a second memory device context. The image in the first memory device context and the memory in the second device context are compared on a pixel-by-pixel basis to determine whether the two stored images match. If the second stored image does not match the first stored image, an indication is presented that the video memory of the computer memory card does not operate properly or that software responsible for displaying the image to the computer display screen is not operating properly.

10 Claims, 10 Drawing Sheets

VIDEO TESTING VIA PIXEL COMPARISON TO KNOWN IMAGE

FIELD OF THE INVENTION

Embodiments of the present invention relate generally to software and hardware testing. More particularly, embodiments of the present invention relate to automated video testing via pixel comparison to known images.

BACKGROUND OF THE INVENTION

In the modern computing environment, a variety of images are displayable to users including pictures, text, and 3-dimensional objects. Additionally, modern computers may display a video portion of an audio/video output where an audio output device such as a speaker presents the audio portion. Users may modify the presentation of computer-generated displays including altering color, brightness, intensity, and resolution of displayed images. In prior art systems, manufacturers or others interested in testing the ability of computer hardware or computer software to properly display an image often required interaction with a human user. That is, testing of various display characteristics was most commonly performed by providing a user a known display and requiring input from the user in response to the display. For example, the user may be provided a display colored red followed by a query to the user to describe the color of the display. If the user's response indicated that the display was not as intended by the tester, the test failed. In other tests, the user may be asked to indicate whether a displayed image changed after the tester changed the resolution in the displayed image. If the user responded affirmatively the test passed. If the user detected no change in the resolution, the test failed. Accordingly, a number of different display tests could be provided to a user where the user would be asked to detect characteristics of the display in order to ensure that the display was received by the user as intended by the tester. Such prior art testing systems lack efficiency and are costly because of the requirement to utilize human test subjects. Moreover, because human test subjects may only respond to displays within the visual range of the tester, the breadth of tests that may be performed by a human test subject is limited.

It is with respect to these and other considerations that the various embodiments of the present invention have been made.

SUMMARY OF THE INVENTION

In accordance with the present invention, the above and other problems are solved by methods and systems for automating the testing of computer-generated displays. According to embodiments of the present invention, the proper functionality of a memory storage device on a computer video card and the proper functionality of software for generating computer-generated displays may be tested by storing a display image to a first memory device context while displaying the same image on a computer screen viewable by a user. The image displayed to the computer screen is captured into a second memory device context. The image in the first memory device context and the memory in the second device context are compared on a pixel-by-pixel basis to determine whether the two stored images match. If the second stored image does not match the first stored image, an indication is presented that the video memory of the computer memory card does not operate properly or that software responsible for displaying the image to the computer display screen is not operating properly. If the two stored images match on a pixel-by-pixel basis, a determination is made that the hardware and software responsible for displaying the image on the computer screen display are working properly. According to aspects of the invention, the automated testing method and system of the present invention may be used to test a simple pattern display, a text display and a 3-dimensional image display. Additionally, the automated testing method and system of the present invention may be used to test the video portion of an audio/video file and automated testing may be performed to ensure that changes in video resolution for displayed images result in corresponding changes in displayed images.

These and various other features as well as advantages, which characterize the present invention, will be apparent from a reading of the following detailed description and a review of the associated drawings.

DETAILED DESCRIPTION OF THE PREFERRED EMBODIMENT

Figure 1:
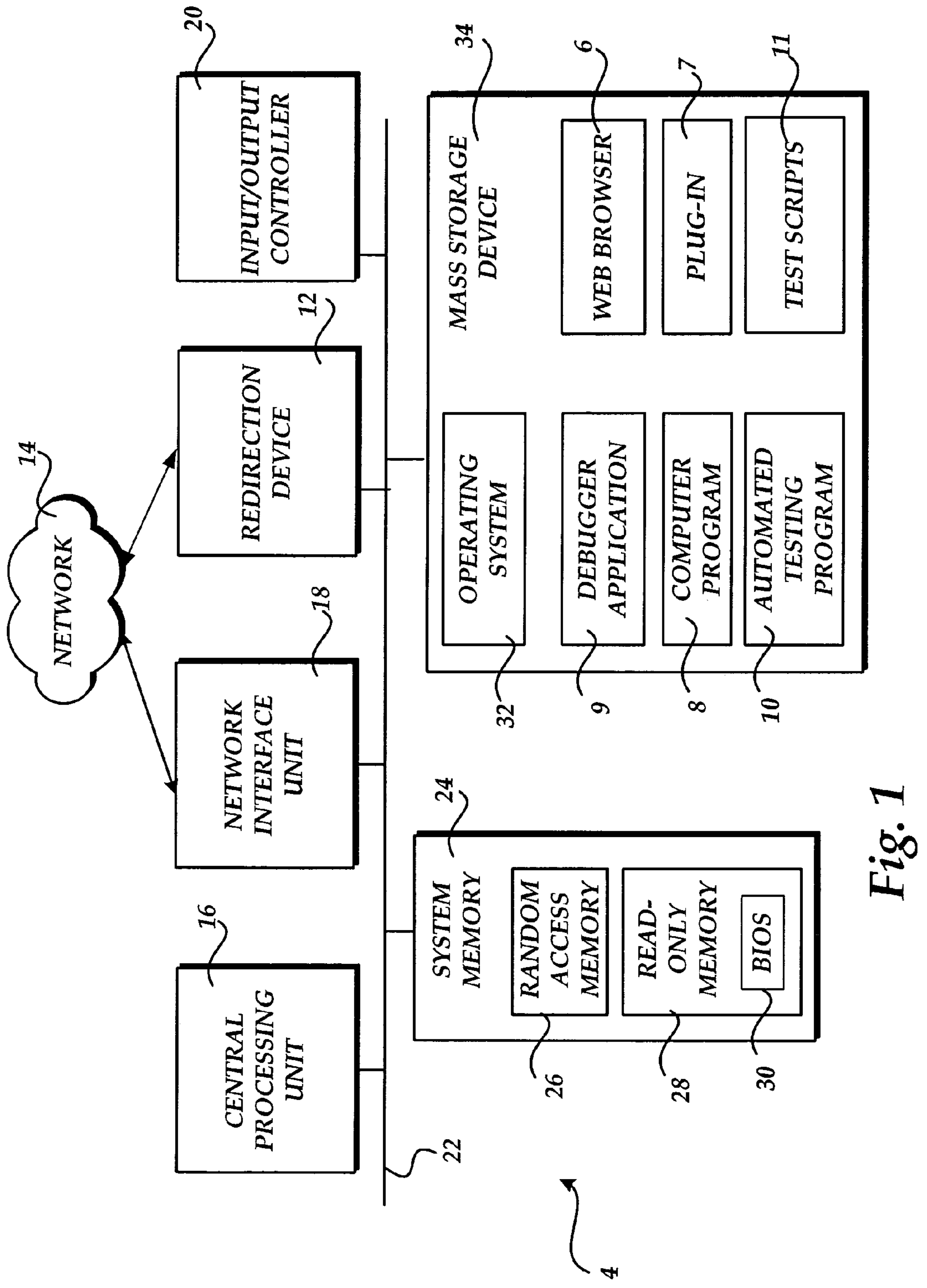
FIG. 1 illustrates a computer architecture for a computer system utilized in various embodiments of the present invention.

As described briefly above, embodiments of the present invention provide methods and systems for automated video testing via pixel comparison to known images. In the following description, references are made to the accompanying drawings that form a part hereof, and in which are shown by way of illustration, specific embodiments or examples. These embodiments may be combined, other embodiments may be utilized, and structural changes may be made without departing from the spirit and scope of the present invention. The following detailed description is, therefore, not to be taken in a limiting sense, and the scope of the present invention is defined by the pending claims and their equivalents.

Referring now to the drawings, in which like numerals refer to like elements through the several figures, aspects of the present invention and the exemplary operating environment will be described. FIGS. 1, 2A–2C and 3 and the following discussions are intended to provide a brief, general description of a suitable operating environment in which the embodiments of the invention may be implemented. While the invention will be described in the general context of program modules that execute in conjunction with an application program that runs on an operating system on a personal computer, those skilled in the art will recognize that the invention may also be implemented in combination with other program modules. Generally, program modules include routines, programs, components, data structures and other types of structures that perform particular tasks or implement particular abstract data types. Moreover, those skilled in the art will appreciate that the invention may be practiced with other computer system configurations, including hand-held devices, multiprocessor systems, multiprocessor-based or programmable consumer electronics, mini computers, mainframe computers, and the like. The invention may also be practiced in distributed computing environments where tasks are performed by remote processing devices that are linked through a communications network. In a distributed computer environment, program modules may be located in both local and remote memory source devices.

Operating Environment

Referring now to FIG. 1, an illustrative computer architecture for a computer 4 for practicing the various embodiments of the invention will be described. The computer architecture shown in FIG. 1 illustrates a conventional server or personal computer, including a central processing unit 16 ("CPU"), a system memory 24, including a random access memory 26 ("RAM") and a read-only memory ("ROM") 28, and a system bus 22 that couples the memory to the CPU 16. A basic input/output system 30 containing the basic routines that help to transfer information between elements within the computer, such as during startup, is stored in the ROM 30. The computer 4 further includes a mass storage device 34 for storing an operating system 32 suitable for controlling the operation of a networked computer, such as the WINDOWS NT or XP operating systems from MICROSOFT CORPORATION of Redmond, Wash. The mass storage device 34 also stores application programs, such as the computer program 8, the automated testing program 10, the Web browser 6 and plug-in 7, and data, such as the test scripts 11 used by the automated testing program 10.

The mass storage device 34 is connected to the CPU 16 through a mass storage controller (not shown) connected to the bus 22. The mass storage device 34 and its associated computer-readable media, provide non-volatile storage for the computer 4. Although the description of computer-readable media contained herein refers to a mass storage device, such as a hard disk or CD-ROM drive, it should be appreciated by those skilled in the art that computer-readable media can be any available media that can be accessed by the computer 4.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer 4 may operate in a networked environment using logical connections to remote computers through a network 14, such as the Internet or a LAN. The computer 4 may connect to the network 14 through a network interface unit 18 connected to the bus 22. It should be appreciated that the network interface unit 18 may also be utilized to connect to other types of networks and remote computer systems. The computer 4 may also include an input/output controller 20 for receiving and processing input from a number of devices, including a keyboard, mouse, or electronic stylus (not shown in FIG. 1). Similarly, an input/output controller 20 may provide output to a display screen, a printer, or other type of output device, including a video card 300, illustrated in FIG. 3.

The computer 4 also includes a redirection device 12. As described above, the redirection device may be internal or external to the computer 4. The redirection device receives and compresses the video output of the computer 4 for transmission over the network 14. The redirection device 12 also transmits the compressed screen displays to a plug-in 7 executing on a remotely located computer, where the data may be decompressed and displayed. Because the redirection device 12 is implemented in hardware, operation of the redirection device 12 is not dependent on the execution of a particular type of operating system 32. Moreover, because the redirection device 12 is implemented in hardware, the operating system 32 does not have to be loaded by the computer 4 for the screen displays of the computer 4 to be compressed and transmitted. In this manner, the computer 4 may be remotely controlled immediately after it is powered on and without the need to load any operating system.

As discussed briefly above, the redirection device also includes input/output ports for connecting peripheral input devices that would otherwise be connected to the computer 4. In particular, a mouse and keyboard (not shown in FIG. 1) may be directly connected to the redirection device 12. Input commands received by these devices may then be passed by the redirection device 12 to the input/output controller 20. Additionally, user input commands may also be received by the plug-in 7 at a remote computer. These commands may be generated by a user or by an automated testing program 10 and are transmitted by the plug-in 7 to the redirection device 12. The remotely generated commands are also passed from the redirection device 12 to the input/output controller 20 for execution on the computer 4 as if the commands were generated locally. In this manner, the operation of the computer 4 and, in particular, the operation of the computer program 8, may be completely controlled from a remote computer.

Figure 2A:
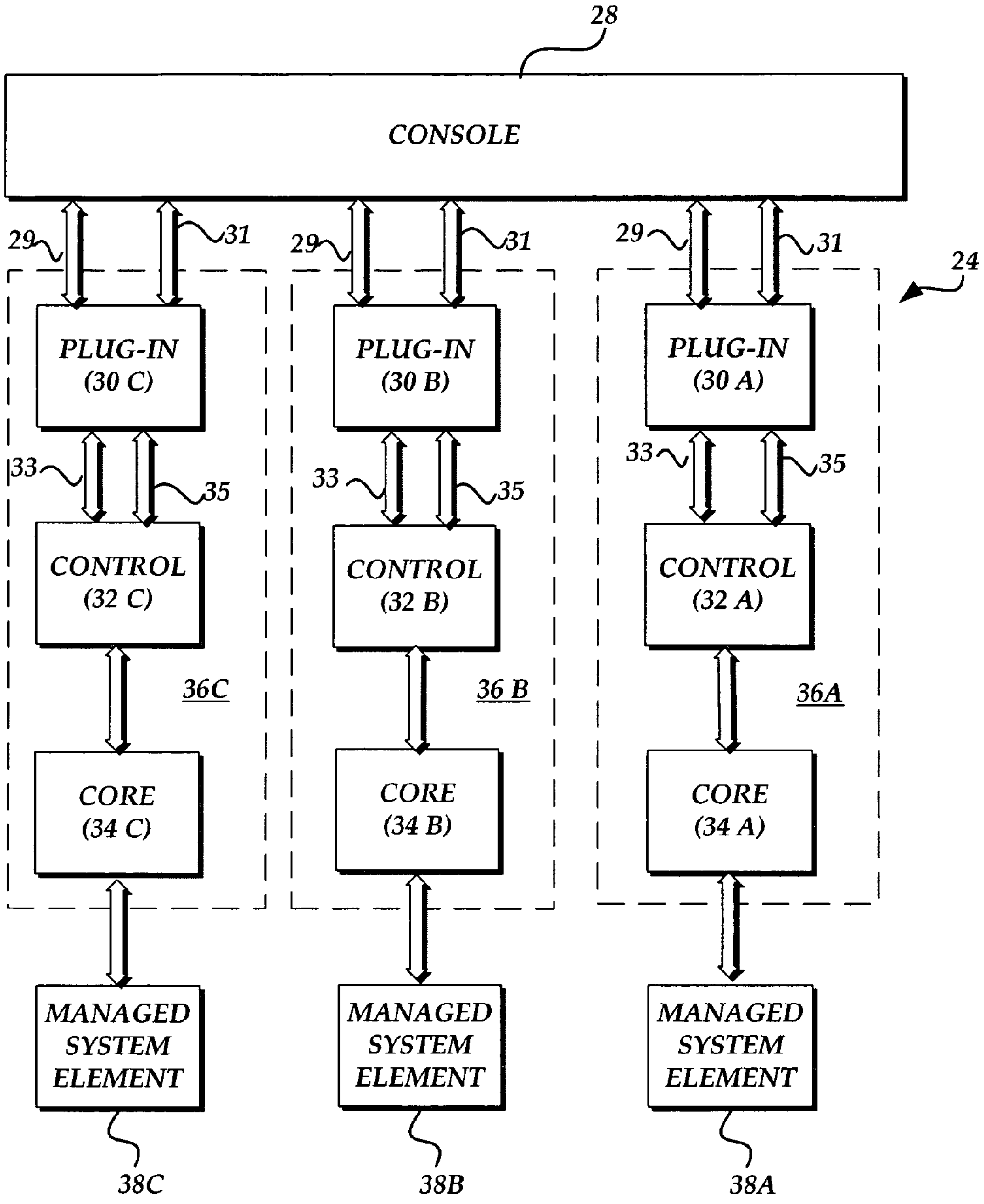
FIG. 2A is a software architecture diagram illustrating an illustrative software architecture for a diagnostics application program provided according to one embodiment of the present invention.

Turning now to FIG. 2A, various aspects of a diagnostics application program 24 will be described. As mentioned briefly above, the diagnostics application program 24 comprises one or more executable software components capable of performing tests on the computer 4 and diagnosing failures and potential failures within the various systems of the computer 4. According to one embodiment of the invention, the diagnostics application program 24 is implemented as a multi-layer stack. At the top of the stack is a console application 28 and at the bottom of the stack is one or more managed system elements 38A–38C.

The console application 28 comprises an executable application program for controlling the operation of the diagnostics application program 24. For instance, the console application 28 may receive user input identifying particular managed system elements 38A–38C upon which diagnostics should be performed. The console application 28 may also receive the identities of particular tests that should be performed on the managed system elements 38A–38C. Additionally, the console application 28 may receive and display information regarding the progress of the diagnostic and its success or failure once the diagnostic has been completed. The console application 28 may also provide other functionality for executing diagnostics in a batch mode.

In order to provide the above-described functionality, the console application 28 communicates with a diagnostics "triplet" 36A–36C for each managed system element 38A–38C. A triplet 36A–36C comprises a plug-in 30A–30C, a diagnostics control module 32A–32C, and a diagnostics core 34A–34C. The plug-ins 30A–30C relay diagnostic information between the console 28 and the control 32 and convert system information from a proprietary format to a format usable by the console 28. Moreover, the plug-ins 30A–30C receive input such as the selection of particular diagnostic test settings and pass the information to the connected diagnostics control module 32. Other types of commands, such as commands for starting or stopping a diagnostic, may also be passed from the plug-ins 30A–30C to the appropriate diagnostics control module 32A–32C. In order to facilitate communication between the plug-ins 30A–30C and the console application 28, an interface 29 is provided for exchanging system information and a separate interface 31 is provided for exchanging diagnostic information.

The diagnostic cores 34A–34C communicate directly with the appropriate managed system element 38A–38C and perform the actual diagnostic tests. The diagnostic cores 34A–34C also gather information about a particular managed system element 38A–38C and pass the information to the appropriate diagnostics control modules 32A–32C. The diagnostics control modules 32A–32C then pass the information back to the appropriate plug-in 30A–30C.

According to various embodiments of the invention, the diagnostics control modules 32A–32C and the plug-ins 30A–30C are implemented as component object model ("COM") objects. The diagnostics control modules 32A–32C and the plug-ins 30A–30C communicate via an interface 33 for exchanging system information 33 and a separate interface 35 for exchanging diagnostic information. The diagnostic cores 34A–34C are implemented as standard dynamically linked libraries ("DLLs").

It should be appreciated that a managed system element 38A–38C may comprise any of the components of a computer system, including software components. For instance, a managed system element 38A may comprise a graphics card or processor, an audio card or processor, an optical drive, a central processing unit, a mass storage device, a removable storage device, a modem, a network communications device, an input/output device, or a cable. According to embodiments of the present invention the managed system element includes the video card 300. Testing of images described below may be performed by the diagnostic cores 34A–34C and the analysis function of the core may be directed by the console application 28. It should also be appreciated that this list is merely illustrative and that managed system elements 38A–38C may comprise other types of computing components.

Figure 2B:
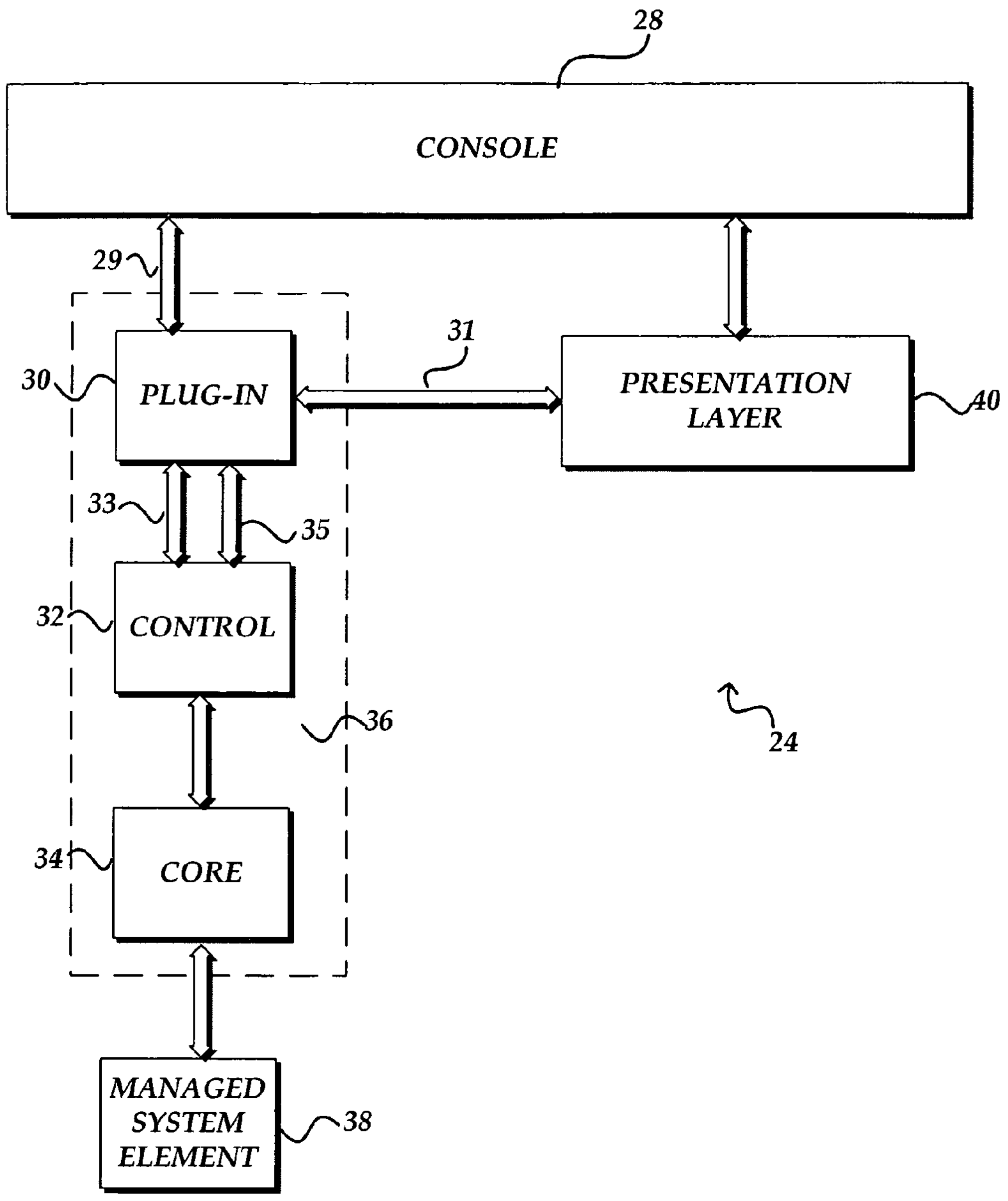
FIG. 2B is a software architecture diagram showing aspects of an illustrative software architecture for a diagnostics application program provided according to one embodiment of the present invention.

Referring now to FIG. 2B, additional aspects of a diagnostics application program 24 provided according to various embodiments of the invention will be described. As shown in FIG. 2B, a separate presentation layer 40 for diagnostic information may be interposed between each of the plug-ins 30A–30C and the console application 28. The console application 28 and the plug-ins 30 retain the interface 29 for communicating system information. However, the console application 28 and the plug-ins 30A–30C can communicate diagnostics information through the presentation layer 40 as if they were communicating directly with each other.

According to various embodiments of the invention, the presentation layer 40 provides an interface to the plug-ins 30A–30C to external programs. For instance, according to one embodiment of the invention, the presentation layer 40 provides functionality for utilizing the diagnostics triplet 36 with a console other than the console application 28, such as a console application provided by a third-party manufacturer. Similarly, the presentation layer 40 may provide functionality for accessing the triplet 36 from a script or a Web page.

In order to provide the above-described functionality, the presentation layer 40 is implemented as an ACTIVEX control in one embodiment of the invention. As known to those skilled in the art, ACTIVEX controls are a type of COM component that can self-register. COM objects implement the "IUnknown" interface but an ACTIVEX control usually also implements some of the standard interfaces for embedding, user interface, methods, properties, events, and persistence. Because ACTIVEX components can support the object linking and embedding ("OLE") interfaces, they can also be included in Web pages. Because they are COM objects, ACTIVEX controls can be used from languages such as VISUAL BASIC, VISUAL C++, and VBSCRIPT from MICROSOFT CORPORATION, and JAVA from SUN MICROSYSTEMS.

Figure 2C:
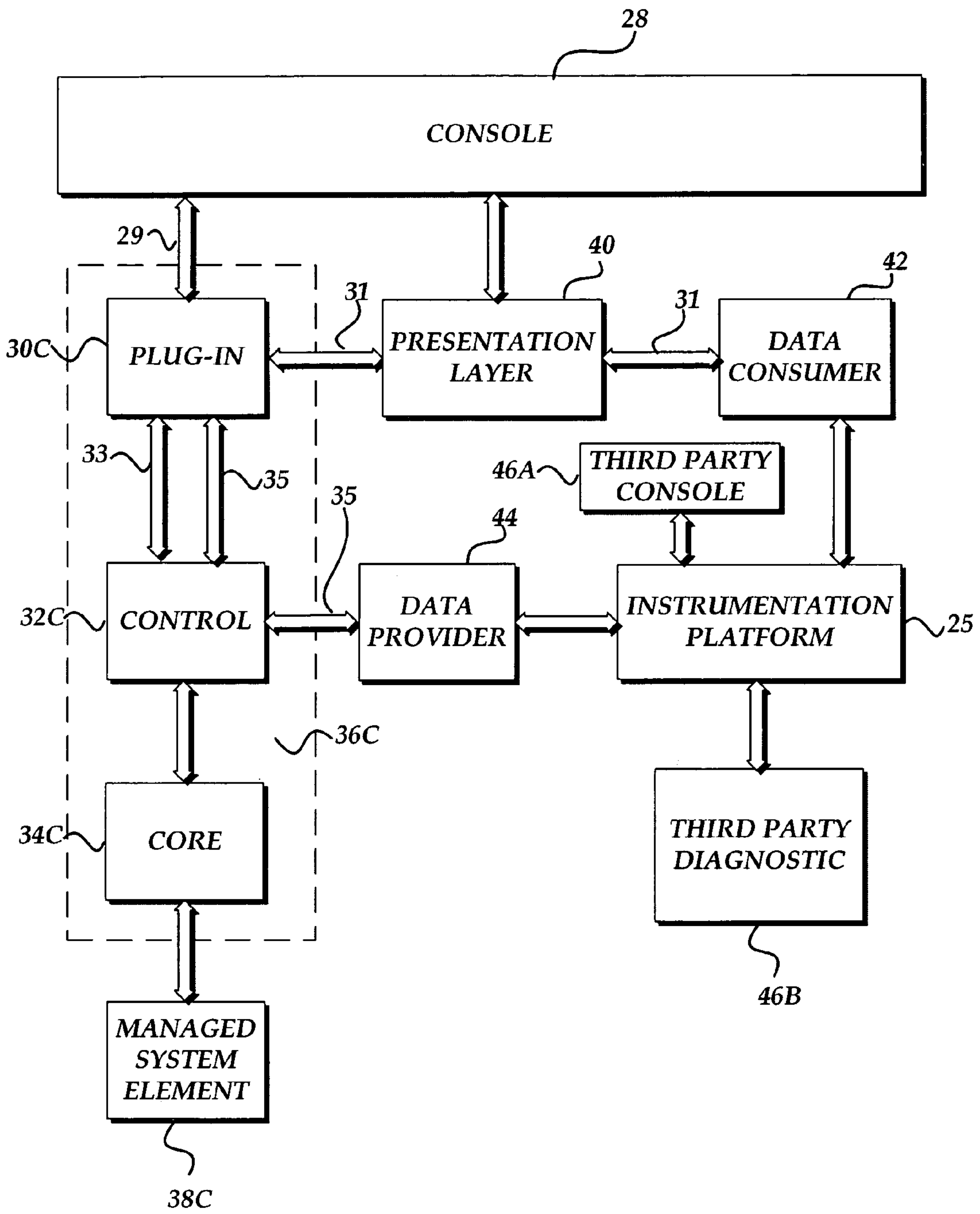
FIG. 2C is a software architecture diagram illustrating an illustrative software architecture for a diagnostics application program provided according to one embodiment of the present invention.

Turning now to FIG. 2C, additional aspects of a diagnostics application program 24 provided according to various embodiments of the invention will be described. As shown in FIG. 2C, in various embodiments of the present invention, an instrumentation data consumer 42 and an instrumentation data provider 44 are provided for enabling communication with an instrumentation platform 25.

The instrumentation data provider 44 provides a communication path between the instrumentation platform 25 and the diagnostic control module 32C. In this manner, a third-party console 46A may utilize the diagnostic control module 32C and receive diagnostic information regarding the managed system element 38C. Moreover, the instrumentation data provider 44 may generate event messages compatible for use with the instrumentation platform 25. Other objects may subscribe for these events through the instrumentation platform 25 and receive the event messages without polling a results object. Additional details regarding the operation of the instrumentation data provider 44 will be described in greater detail below.

The instrumentation data consumer 42 provides a communication path between the instrumentation platform 25 and the presentation layer 40. Through the instrumentation data consumer 42, the presentation layer 40 and the console application 28 have access to diagnostic information maintained by the instrumentation platform 25. For instance, through the instrumentation data consumer 42, the presentation layer 40 can execute and receive diagnostic result messages from third-party diagnostics 46B configured for use with the instrumentation platform 25 and not otherwise usable by the console application 28. Additionally, the data consumer 42 may register to receive diagnostic event messages from the instrumentation platform 25. The event messages when received may then be converted by the data consumer 42 for use by the presentation layer 40 and the console application 28. Additional details regarding the operation of the instrumentation data consumer 42 will be described in greater detail below.

Figure 3:
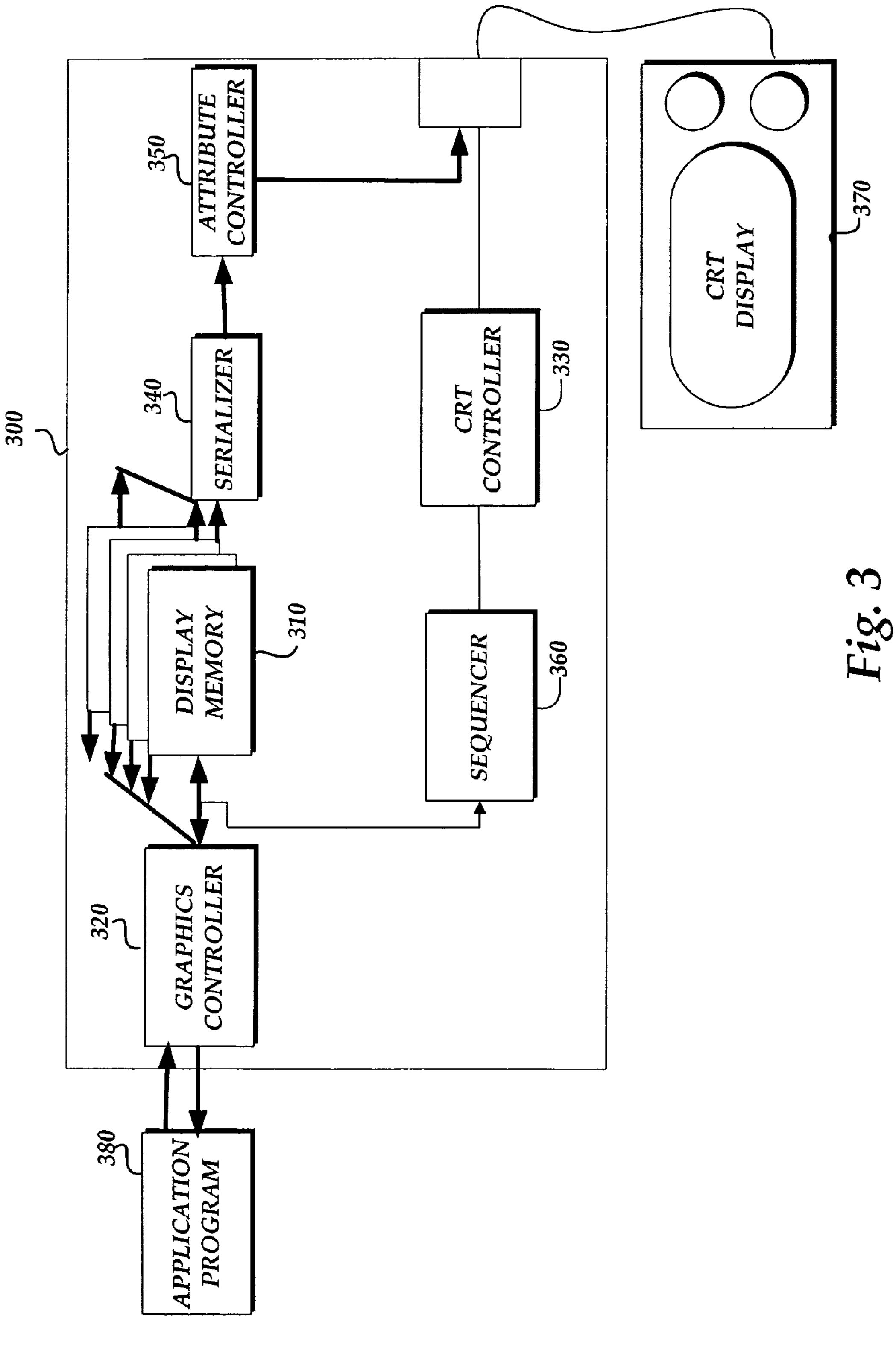
FIG. 3 illustrates a simplified block diagram of a computer video card.

Turning now to FIG. 3, an illustrative video card 300 is described. As is known to those skilled in the art, the video card 300 includes electronic components that generate a video signal sent through a cable to a video display such as the cathode-ray tube (CRT) display 370. The video card 300 is typically located on the bus 22 of the computer 4 such as is indicated by the input/output controller 20 illustrated in FIG. 1. According to an embodiment of the present invention, the video card 300 includes a display memory 310 which is a bank of 256K bytes of dynamic random access memory (DRAM) divided into four color planes which hold screen display data. The display memory 310 serves as a buffer that is used to store data to be shown on the display. When the video card is in a character mode, the data is typically in the form of ASCII characters and attributes codes. When the video card is in a graphics mode, the data defines each pixel. According to an embodiment of the present invention, the operability of the video card 300 and the display memory 310 are tested by storing a first image to the display memory and by comparing that image to the same image captured from the CRT display 370.

The graphics controller 320 resides in a data path between the CPU 16 of computer 4 and the display memory 310. The graphics controller can be programmed to perform logical functions including AND, OR, XOR, or ROTATE on data being written to the display memory 310. These logical functions can provide a hardware assist to simplify drawing operations. The CRT controller 330 generates timing signals such as syncing and blanking signals to control the operation of the CRT display 370 and display refresh timing. The data serializer 340 captures display information that is taken from the display memory 310 one or more bytes at a time and converts it to a serial bit stream to be sent to the CRT display 370. The attribute controller 350 contains a color look-up table (LUT), which translates color information from the display memory 310 into color information for the CRT display 370. Because of the relatively high cost of display memory 310, a typical display system will support many more colors than the matching display adapter can simultaneously display.

The sequencer 360 controls the overall timing of all functions on the video card 300. It also contains logic for enabling and disabling color panes. The CRT display 370 may be associated with a video capture device for capturing a display presented on the CRT display 370 for comparing back to an image stored from the display memory 310. A video capture device (not shown) includes electronics components that convert analog video signals to digital form and stores them in a computer's hard disk or other mass storage device. Accordingly, as should be understood by those skilled in the art, when a signal is received from an application program 380 operated by the computer 4 via the central processing unit 16 including data intended for display of the CRT display 370, the signal is written to the display memory 310 and is untimely converted into a serial bit stream to be sent to the CRT display 370 for presentation to a user.

Operation

According to embodiments of the present invention, a video display presented on a user's CRT display 370 is automatically tested to avoid the use of human test subjects in an interactive display test session. According to the embodiments described below, testing and display of results associated with the following tests are controlled and performed at the control of software modules in conjunction with the cores 34A, B, and C and console application 28 described above with reference to FIGS. 1, 2A–2C where the video card 300 and subcomponents of the video card serve as a managed system elements 38A, B, and C.

According to one embodiment of the present invention, an image intended for display on the CRT 370 for presentation to a user is stored in the display memory 310. The display memory 310 may serve as a first memory context for saving an image to be displayed on the CRT display. Alternatively, a copy of the image to be displayed may be saved to another suitable memory storage device, as described above with reference to FIG. 1. After a copy of the image to be displayed is stored to a first memory context, the image is passed through the serializer 340, the attribute controller 350 and is displayed on the CRT display 370. Once the image is displayed on the display 370, the image is captured from the display 370 by a video capture device, and the captured image is saved to a second memory context. For example, the captured display image may be saved to the display memory 310, or the captured display image may be saved to another suitable memory storage device, as described above with reference to FIG. 1.

After the first and second images are stored, as described, an image comparison software module operated by the core 34C, 34B, 34A, as described above with reference to FIGS. 2A, 2B, 2C, compares the two stored images on a pixel-by-pixel basis. If all pixels from the second image (displayed image) match on a one-by-one basis to the pixels of the first stored image, the test is determined to have passed indicating that the display memory 310 and other components of the video card 300 are in proper operating order. Alternatively, a passing condition may indicate that no problems exist with the application program 380 from which the display data was received. If the pixels from the stored image do not match on a one-by-one basis to the pixels associated with the first stored image, the test is considered to have failed. As should be understood by those skilled in the art, a threshold including an acceptable number non-matching pixels may be established to determine a pass versus fail condition as opposed to requiring a pixel-by-pixel match between the two stored images.

Figure 4:
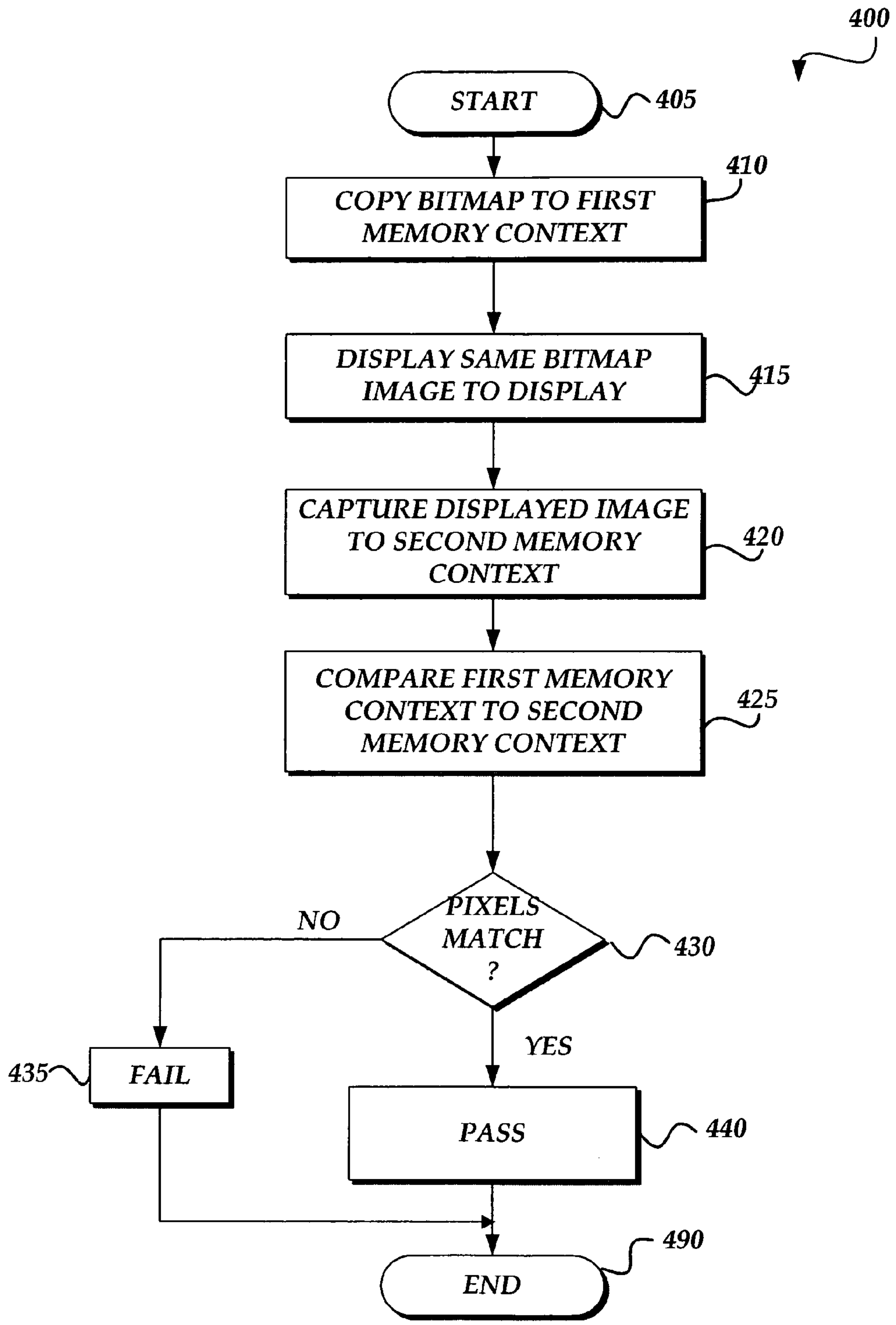
FIG. 4 illustrates an operational flow for testing the display of a simple pattern.

FIG. 4 illustrates an operational flow for testing the display of a simple pattern. The method 400 begins at start step 405 and a simple pattern such as a square, circle, or other image for testing the display of a simple pattern is sent by the CPU 16 through an application program 380 and is buffered in the display memory 310 for ultimate display to the display 370, as described above. Alternatively, the image may be sent to the memory 380 by the core application 34A, B, C, as described with reference to FIGS. 2A, B, C. At step 410, a bitmap of the pattern image to be displayed is copied and is stored to a first memory context, such as a separate memory location in the display memory 310 or to a separate memory storage device such as the memory 26 illustrated in FIG. 1. At step 415, the image to be displayed is passed through the video card 300 to the display 370. At step 420, a video capture device captures the image displayed on the display 370 and stores the captured image to a second memory context. For example, the displayed image may be stored to a memory location in the display memory 310, or the captured image may be stored in a separate memory location, such as the memory 26 illustrated in FIG. 1.

At step 425, the first stored image and the second stored image (displayed image) are compared on a pixel-by-pixel basis, as described above. If any pixels in the second image do not match pixels in the first image, the method proceeds to step 435 and the test is designated as a failure. The method ends at step 490. If all pixels from the second stored image match all pixels from the first stored image, the method proceeds to step 440 and the test is designated as a pass. The method ends at step 490. As should be understood, if the test fails, an indication is made that some problem exists in hardware such as the video card 300, display memory 310, or software such as the application program 380. Consequently, the test of the displayed image is made without the need for a human test subject to view the displayed image as a method of testing the quality of the displayed image.

Figure 5:
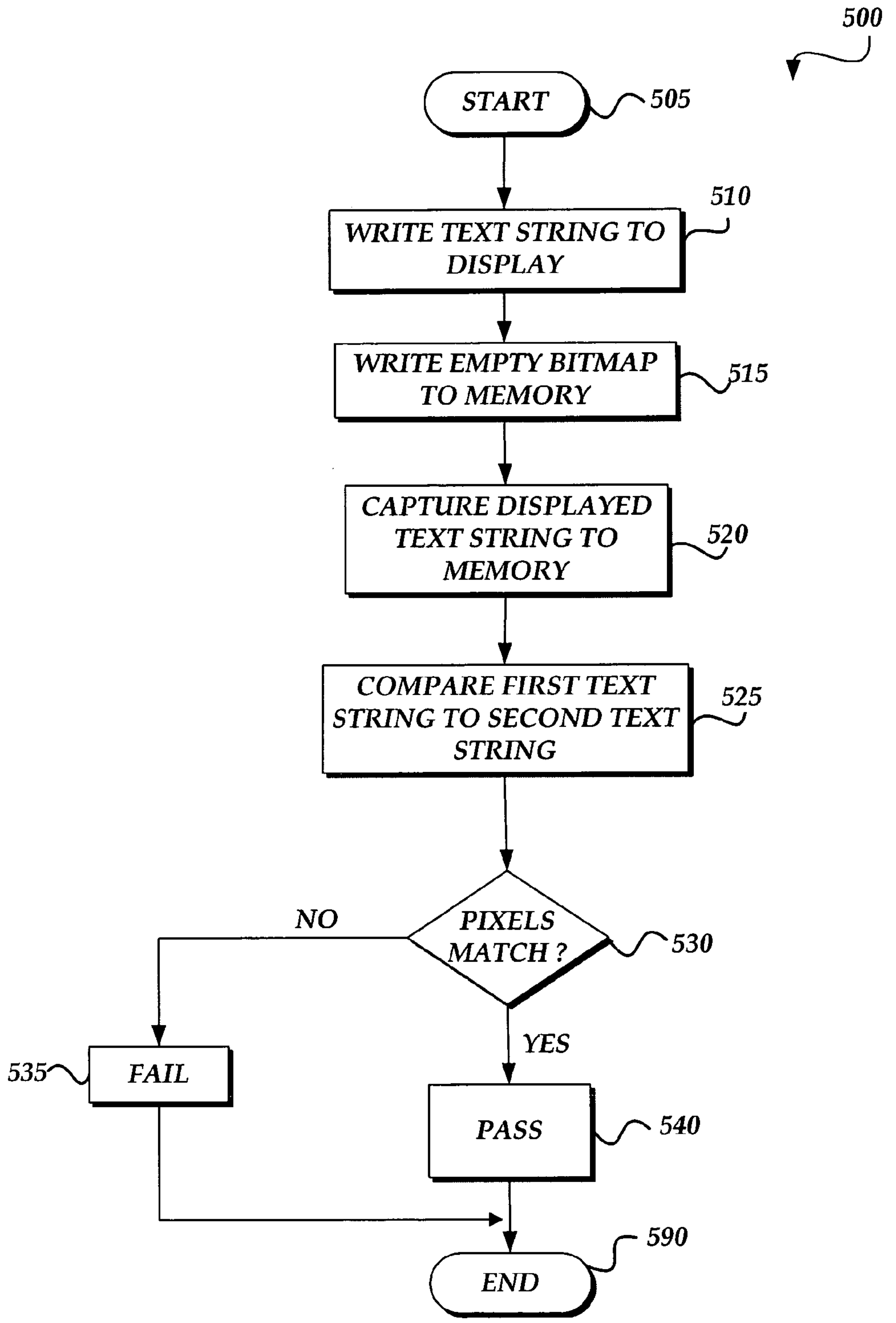
FIG. 5 illustrates an operational flow for testing the display of a text string.

FIG. 5 illustrates an operational flow for testing the display of a text string. The method 500 begins at start step 505 and proceeds to step 510 where a test of the display of a text string is initiated. At step 510, a text string is written to the display 370 using a software application program such as DrawText. As understood by those skilled in the art, the DrawText software application module is an application-programming interface (API) that may be used to render text according to a selected font. At step 515, an empty bitmap is created and stored to a first memory location such as the display memory 310 of the video card 300 or the memory 26 of the computer 4. At step 520, the video capture device captures the displayed text string and stores the captured text string to a second memory context (location), such as the memory 26 of the computer 4. After the displayed text string is written to the second memory context, the same text string is written using DrawText to the first memory location containing the empty bitmap.

At step 525, the stored displayed text string is compared to the text string written to the empty bitmap. If both text strings are the same, the method proceeds to step 540 and the test passes. If any pixels from the second stored text string do not match pixels from the first stored string, the method proceeds to step 535 and the test fails. Alternatively, analysis of the display of the text string may be performed as described with reference to FIG. 4 where a bitmap of the text string is first copied to a first memory context and the displayed text string is captured for storage to a second memory context. Finally, the two stored text strings are compared on a pixel-by-pixel basis.

Figure 6:
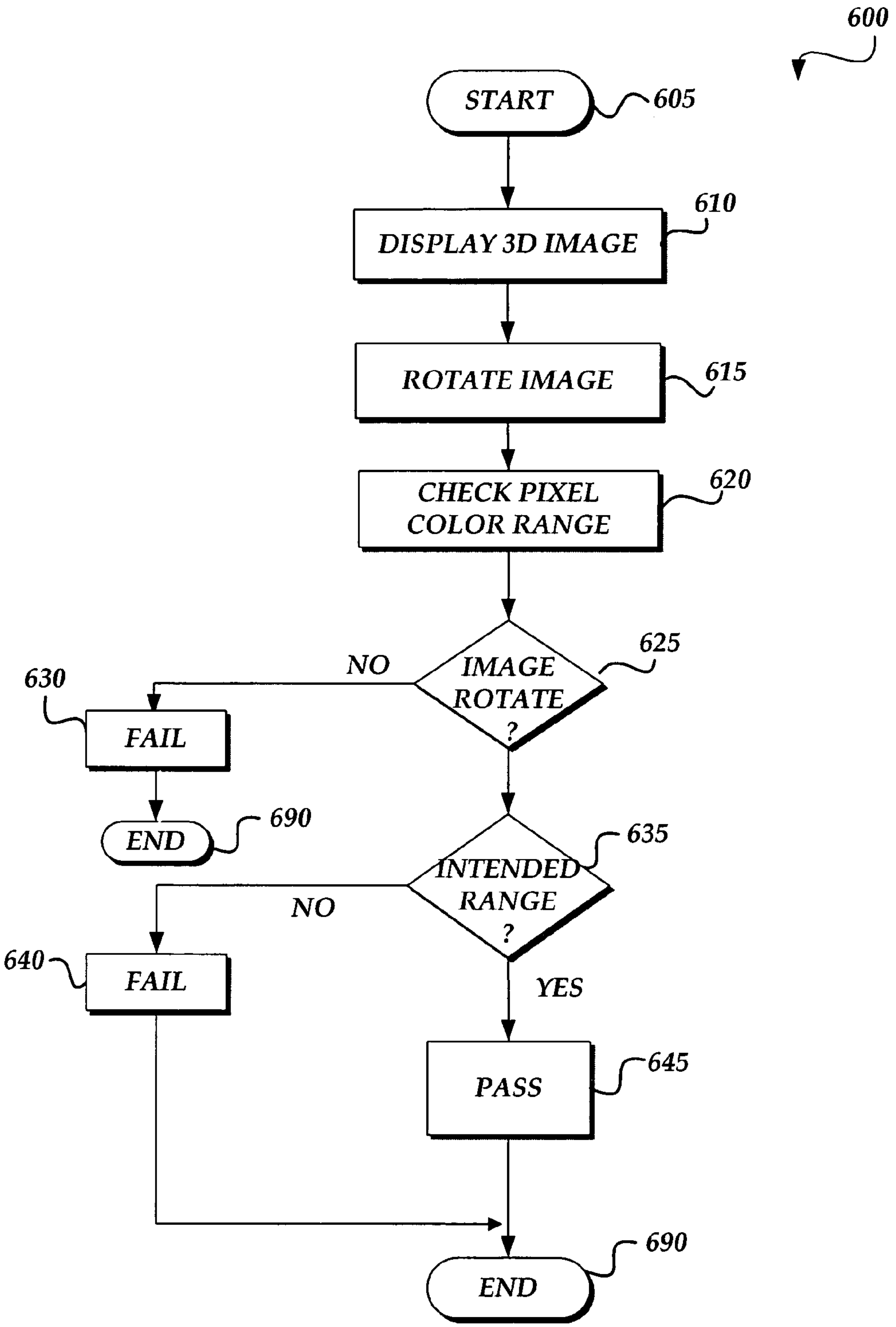
FIG. 6 illustrates an operational flow for testing the display of a 3-dimensional image.

FIG. 6 illustrates an operational flow for testing the display of a 3-dimensional image. The method 600 begins at start step 605 and proceeds to step 610 where a non-interactive diagnostic test of a rotatable 3-dimensional image is performed. At step 610, a rotatable 3-dimensional image is displayed on the display 370, illustrated in FIG. 3. According to one embodiment of the present invention, the rendering of the pixels for the stopped 3-dimensional image is done according to the MessageLoop API. As should be understood, the test may be likewise performed on a non-rotatable 3-dimensional image. At step 615, the image is rotated. At step 620, the image is stopped from rotation. Once the image is stopped from rotation, a video capture device captures the stopped image on the screen and stores the captured image to a first memory device context such as the memory 26 illustrated in FIG. 1. The test performed on the 3-dimensional image is performed by comparing pixels of the displayed image stored to memory against a known color range for a selected pixel. At step 620, a selected pixel from the stored displayed image is taken from a position X/2,Y/2 and compared to known color ranges where X is the X-axis of the pixel grid and Y is the Y-axis of the pixel grid.

For the selected pixel, a determination is made as to whether a red color, if any, associated with the pixel is between the range of 215 and 256 where a green color or blue color associated with the pixel should be zero. Alternatively, a blue color, if any, associated with the pixel should be in a range between 215 and 256 and green color and red color associated with the pixel should be zero. As should be understood, the color ranges for providing an acceptable automated test vary from one display 370 to a different display 370 and are established on a case-by-case basis. Because the renderings of the pixels are done in a MessageLoop API, the test routine described above is called repeatedly. For example, on a 450-megahertz computer, the rendering function, described above, may be called approximately 291 times when the test is executed for 7500 milliseconds.

At step 625, a test is also performed to determine whether the 3-dimensional image is able to rotate. If the 3-dimensional image is a rotatable image and the image is not able to rotate, the method proceeds to step 630 and a failure condition is established. If the image is able to rotate, or if the image is not a rotatable image the method proceeds to step 635, and a determination is made as to whether the examined pixel fell into the intended color range. If not, the method proceeds to step 640 and a failure condition is established. If the examined pixel falls in the intended color range, as described above, the method proceeds to step 645 and a passing condition is established. The method ends at step 690. As should be understood, the testing described with respect to FIG. 6 is repeated through various rotations of the 3-dimensional object for a number of different pixels to ensure that the displayed image is being rendered properly.

Figure 7:
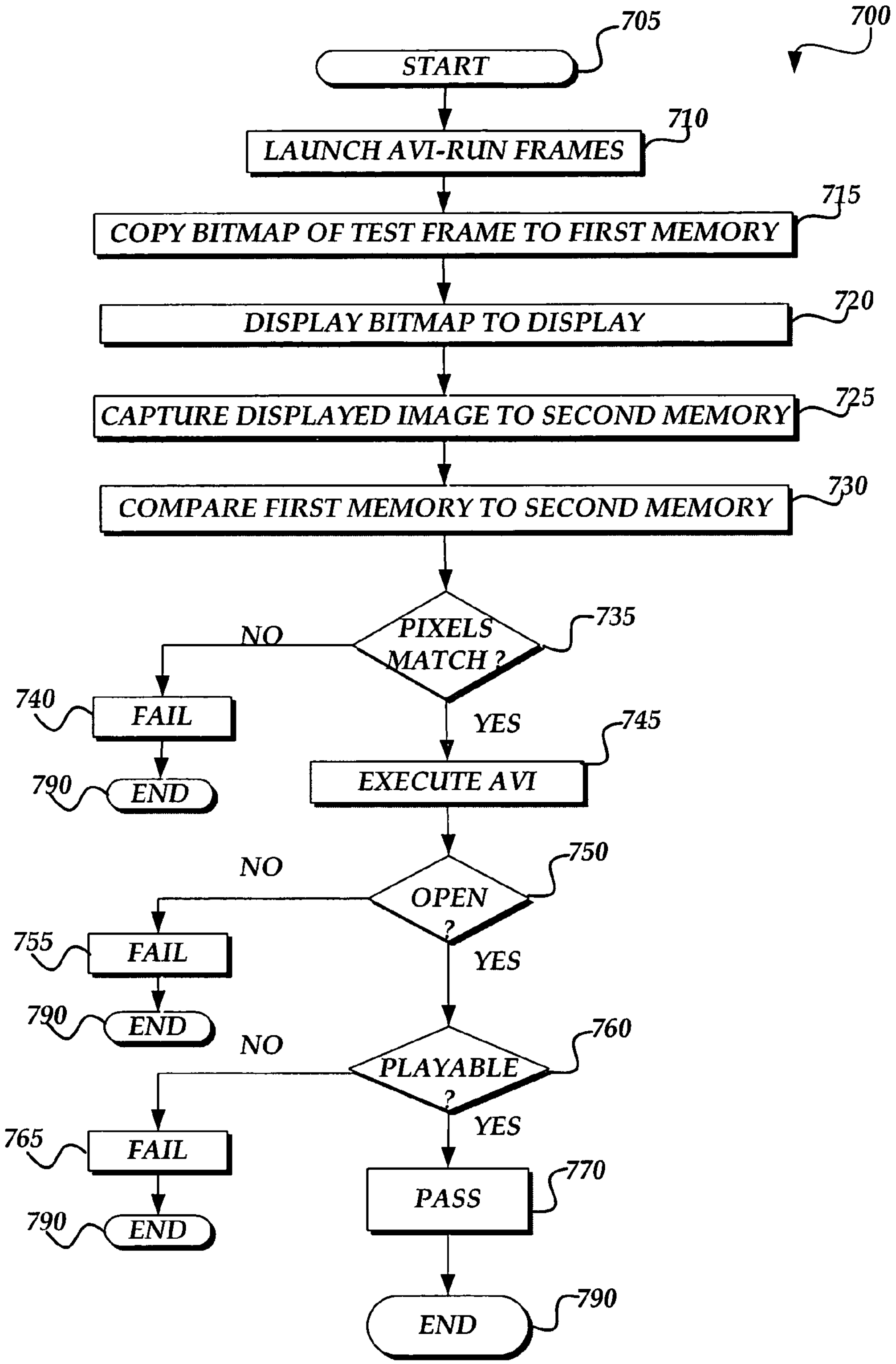
FIG. 7 illustrates an operational flow for testing an audio/video file.

FIG. 7 illustrates an operational flow for testing an audio/video file. The method 700 begins at start step 705 and proceeds to step 710 where an audio video interleaved (AVI) file is tested to ensure that the video portion of the file is displayed properly. As understood by those skilled in the art, an AVI is a Windows multimedia file format for sound and moving pictures that uses the Microsoft resource interchange file format specification. At step 710, the AVI file is launched and frames of the AVI file are displayed. At step 715, a test frame from the AVI file is copied as a bitmap file to a first memory context such as the memory 26 of the computer 4. At step 720 the test bit map is displayed to the display 370. At step 725, the video capture device captures the displayed image of the AVI test frame and stores the captured image to a second memory context such as the memory 26 of the computer 4. At step 730, the captured displayed image is compared on a pixel-by-pixel basis to the image stored to the first memory context. At step 735, a determination is made as to whether all pixels from the first stored image match all pixels from the second stored image. If not, the method proceeds to step 740 and a failure condition is established. If all pixels between the first image and the second image match, the method proceeds to step 745, and the AVI file is opened and played. At step 750, a determination is made as to whether the AVI file will open. If not, a failure condition is established at step 755. If the AVI file opens, a determination is made at step 760 as to whether the AVI file will play, thus sending successive display frames to the display 370. If the AVI file will not play, a failure condition is established at step 765. If the AVI file will play, the method proceeds to step 770 and a pass condition is established. The method ends at step 790.

Figure 8:
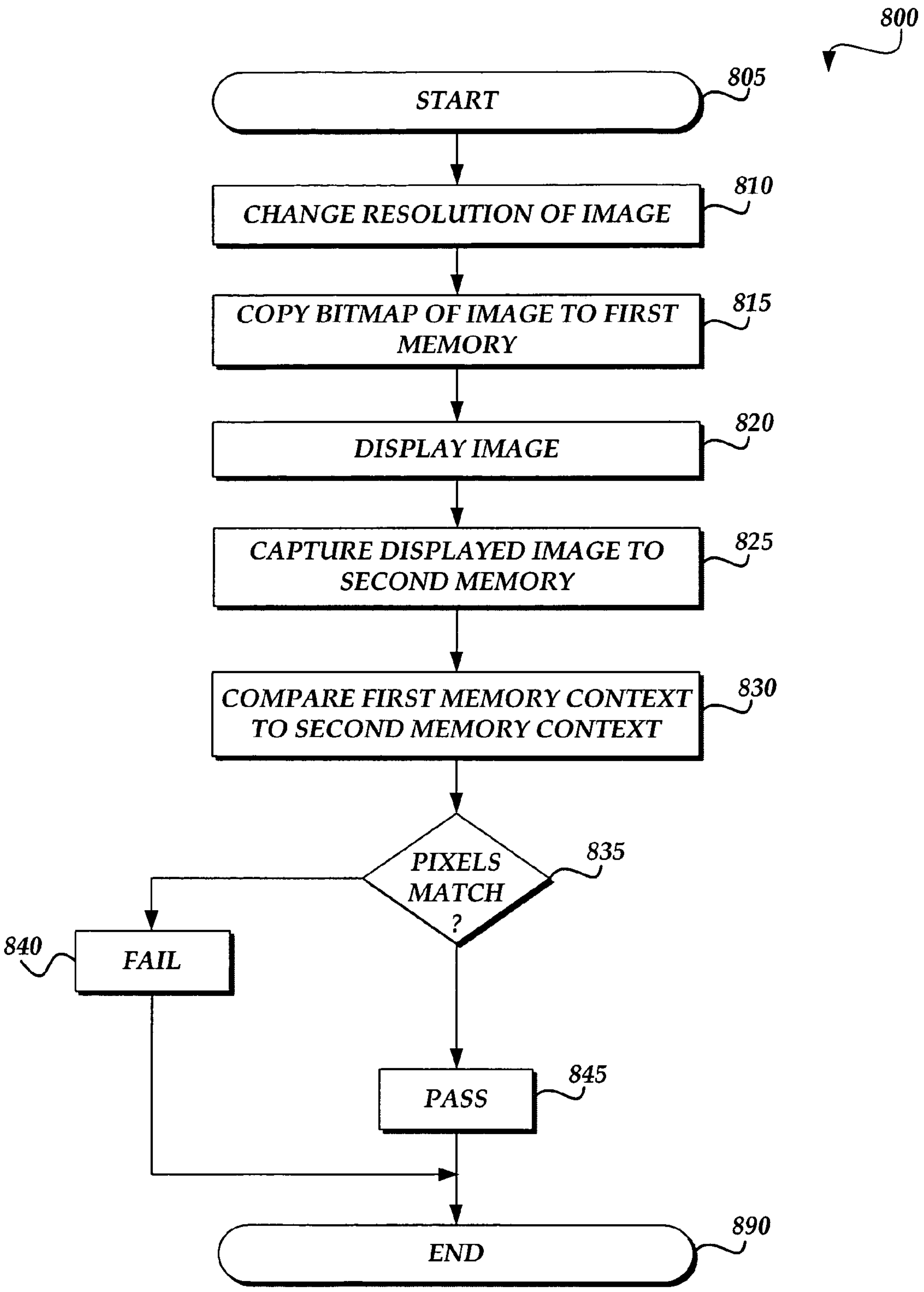
FIG. 8 illustrates an operational flow for testing the result of changes in the resolution of the displayed image.

FIG. 8 illustrates an operational flow for testing the result of changes in the resolution of the displayed image. The method 800 begins at start step 805 and proceeds to step 810 where a test is performed to ensure that a display resolution setting may be changed successfully. At step 810, an application programming interface (API) is used to change the resolution of an image to be displayed by the video card 300 onto the display 370. At step 815, a bitmap of the image to be displayed is copied to a first memory context such as the display memory 310 or to a separate memory location such as memory 26 illustrated in FIG. 1. At step 820, the image is displayed on the display 370. At step 825, the video capture device captures the displayed image and stores the captured image to a second memory context such as the memory 26. At step 830, the first stored image is compared to the second stored image on a pixel-by-pixel basis. If all pixels match between the first and second stored images, a pass condition is established at step 845. If not, a failure condition is established at step 840. As should be understood by those skilled in the art, the resolution test described with reference to FIG. 8 is in effect a continuation of the test method described with reference to FIG. 4. That is, after a pattern test is performed, the resolution of the test image may be changed by an application programming interface (API) followed by a subsequent test of a displayed version of that image to insure that the displayed image stays identical to the pre-displayed image on a pixel-by-pixel basis after the change in resolution. As should be understood, the test may be performed in successive iterations at different resolution settings.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for automatically testing the video display functionality of a computer video card, comprising:

displaying a three dimensional image on a computer display monitor according to a first display orientation;

rotating the three dimensional image on the computer display monitor to a second display orientation;

capturing the three dimensional image displayed according to the second display orientation;

storing the captured three dimensional image to a memory location;

comparing one or more selected pixels of the stored captured three dimensional image to a known color range for the one or more selected pixels;

if a color of the one or more selected pixels does not fall within the known color range for the one or more selected pixels, designating the computer video card as failing the video test; and if the three dimensional image does not rotate to a second display orientation, designating the computer video card as failing an image rotation test.

2. A method for automatically testing an audio video interleaved (AVI) file, comprising:

displaying frames of the AVI file on a computer display monitor;

copying one of the displayed frames as a test frame to a bitmap file in a first memory context;

displaying the bitmap file on the computer display monitor;

capturing the displayed bitmap file and storing the captured displayed bitmap file to a second memory context;

comparing the captured displayed bitmap file in the second memory context to the bitmap file copied to the first memory context on a pixel-by-pixel basis;

if any pixel of the bitmap file copied to the first memory context is different from a corresponding pixel of the bitmap file stored in the second memory context, designating the AVI file as failing a video test playing the AVI file to determine whether a set of frames comprising the AVI file are displayed on the computer display monitor successively; and if the set of frames comprising the AVI file are not displayed on the computer display monitor successively, designating the AVI file as failing an AVI operability test.

3. A method for automatically testing the video display functionality of a computer video card, comprising:

storing a first computer displayable image in a first memory context;

passing the image through a computer video card for displaying on a computer display monitor;

displaying the image on the computer display monitor;

capturing the displayed image and storing the captured displayed image to a second memory context;

comparing the first stored image to the second stored image on a pixel-by-pixel basis to determine whether the second stored image is substantially the same as the first stored image after the first image is displayed on the computer display monitor;

if the first stored image is not substantially the same as the second stored image, designating the computer video card as failing a video test;

after comparing the first stored image to the second stored image to determine whether the second stored image is substantially the same as the first stored image, changing the resolution of the first stored image;

storing the first stored image having the changed resolution in the first memory context;

passing the first stored image having the changed resolution through a computer video card for displaying on a computer display monitor;

displaying the first stored image having the changed resolution on the computer display monitor;

capturing the displayed first stored image having the changed resolution and storing the captured displayed image to a second memory context; and comparing the first stored image having the changed resolution to the second stored image having the changed resolution to determine whether the second stored image having the changed resolution is substantially the same as the first stored image having the changed resolution after the change in resolution of the first stored image.

4. The method of claim 3, prior to storing a first computer displayable image in a first memory context, generating a bitmap of the first computer displayable image for storing in the first memory context.

5. The method of claim 4, whereby the first computer displayable image is a simple pattern image.

6. The method of claim 5, whereby the first computer displayable image is a text screen.

7. The method of claim 6, whereby the first computer displayable image is a three dimensional image.

8. A computer-readable medium having computer-executable instructions stored thereon which, when executed by a computer, cause the computer to perform the method of claim 1.

9. A computer-readable medium having computer-executable instructions stored thereon which, when executed by a computer, cause the computer to perform the method of claim 2.

10. A computer-readable medium having computer-executable instructions stored thereon which, when executed by a computer, cause the computer to perform the method of claim 3.

* * * * *